Aug. 4, 1964     C. A. IRAZOQUI     3,142,909
ELECTRONIC SOUND REPEATER MECHANISM
Filed Oct. 31, 1961     3 Sheets—Sheet 1

INVENTOR.
Carlos A. Irazoqui
BY
Bacon & Thomas
ATTORNEYS

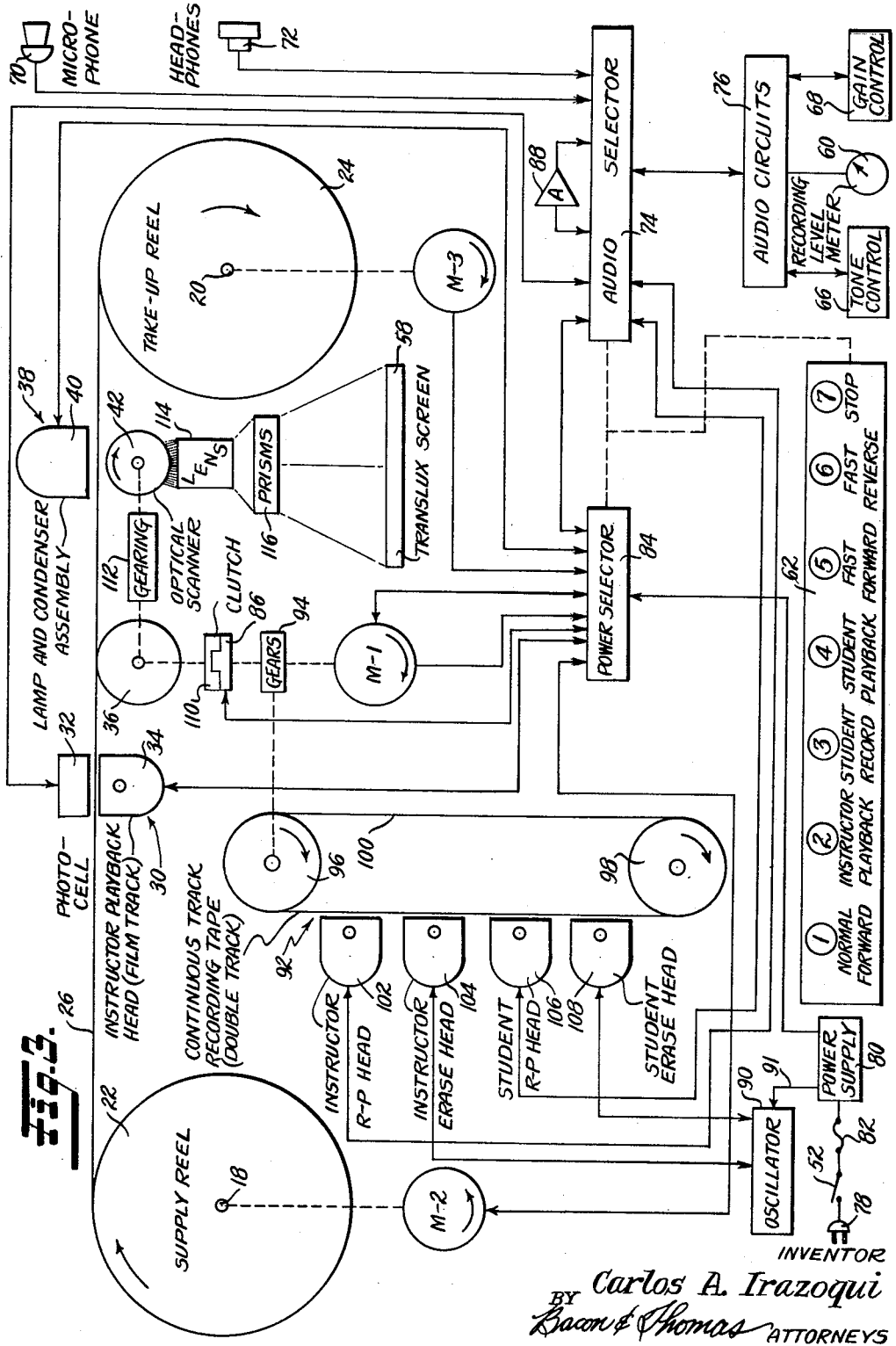

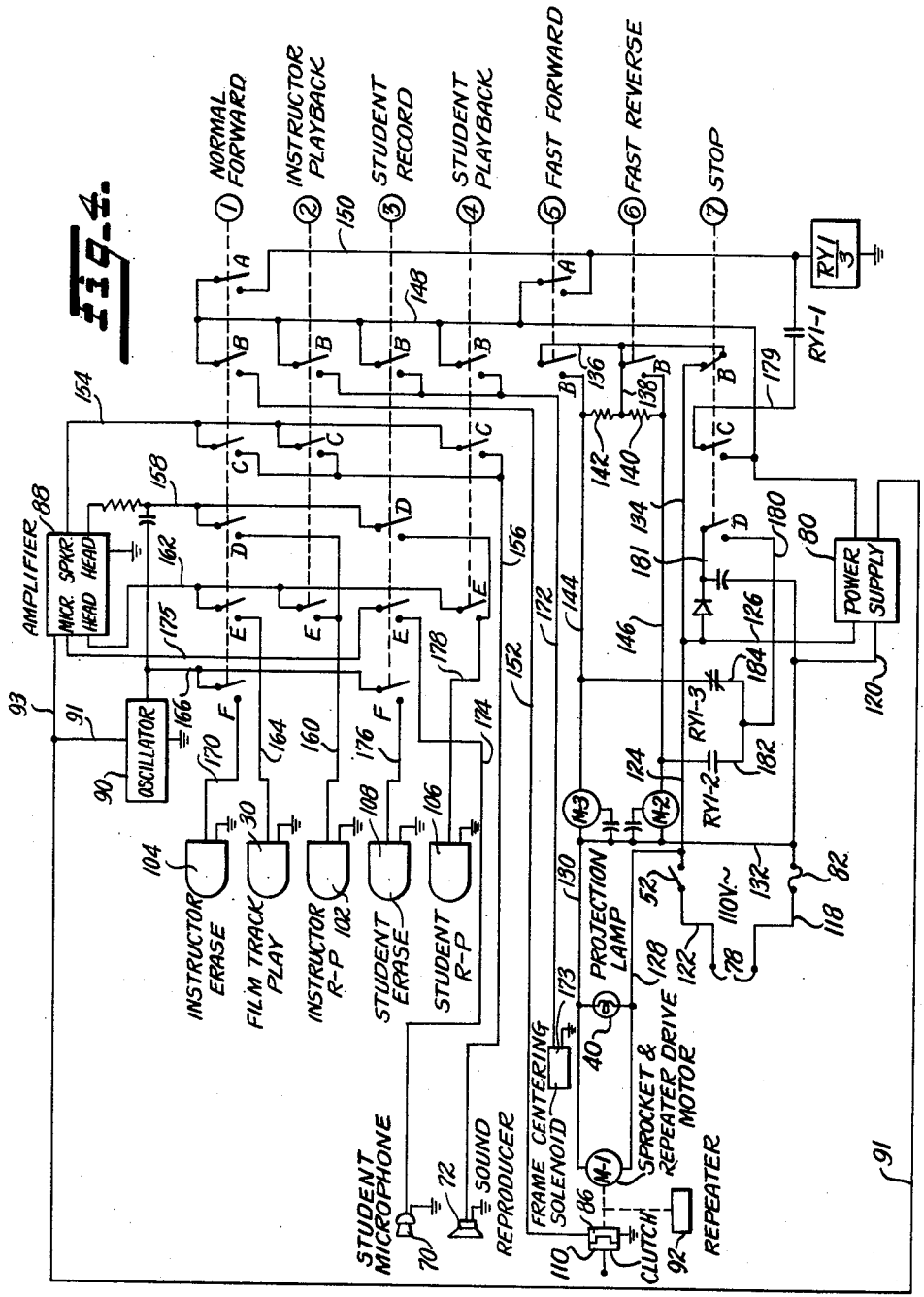

United States Patent Office 3,142,909
Patented Aug. 4, 1964

3,142,909
ELECTRONIC SOUND REPEATER MECHANISM
Carlos A. Irazoqui, New York, N.Y., assignor to
Linguatronics, Inc., Washington, D.C.
Filed Oct. 31, 1961, Ser. No. 149,109
11 Claims. (Cl. 35—35)

This invention relates to a novel endless recorder mechanism, and more specifically to an educational device employing a first member capable of projecting a motion picture on a screen and reproducing a recorded sound from a film containing such motion picture and a sound track, and a second member, having a pair of sound tracks, capable of selectively recording and erasing recorded sounds, and to a method of employing said device for educational purposes.

In my earlier-filed application for an Audio-Visual Electronic Instructor, Serial No. 792,544, filed February 11, 1959, now Patent No. 3,026,634, there is disclosed an apparatus for audio and visual instruction comprising a recording and projecting device, in which a motion picture film, having a series of pictures and a pair of sound tracks, is employed. One of the sound tracks contains a permanent optical or magnetic recording synchronized with pictorial matter on the film. The other sound track is of the magnetic-type, on which a sound may be recorded and erased by means well known in the art. In operation, a student, after viewing the projected picture and hearing the permanently recorded sound on one track, reverses the film to that point on the film where the particular optical sound track concerned begins, and then operates the film forwardly while repeating and recording, on the magnetic sound track, the sound that is permanently recorded on the instructor's sound track. This arrangement has been found to be exceedingly practical in the teaching of languages, singing, playing of musical instruments, etc., but suffers from the disadvantage that it always becomes necessary to reverse the film whenever the student wishes to repeat and record his own voice or repetition of the permanently recorded sound on the film, or to play back his own recorded voice or sound.

It is an object of this invention, therefore, to provide a novel endless recorder mechanism in which it is unnecessary to reverse the instructor film to enable the student to record and play back his repetition of the sounds permanently recorded on the instructor film.

It is a further object to provide a novel endless recorder mechanism of the above type, which can be used in connection with sounds other than those recorded on the film, at the option of the student.

It is still a further object to provide a novel endless recorder mechanism of the type discussed above, which is exceedingly simple to operate, which is virtually foolproof, and which does not easily get out of order.

It is a still further object to provide a novel method of audio-visual instruction.

The above and other objects and advantages will be apparent in the following detailed description in conjunction with the accompanying drawings, in which:

FIG. 3 is a schematic showing of the mechanical and electrical controls; and

FIG. 4 is a diagrammatic showing of the electrical circuit.

Figure 1:
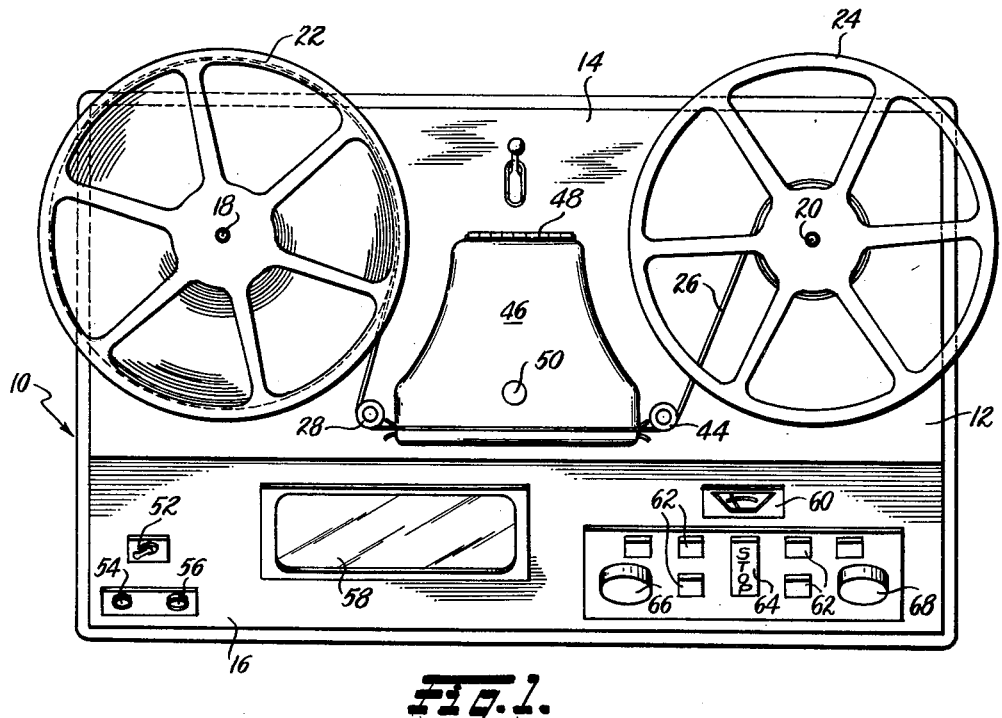
FIG. 1 is a plan view of a preferred form of apparatus embodying the invention.
Figure 2:
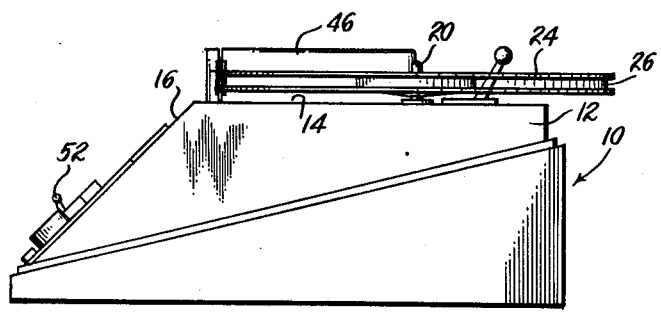
FIG. 2 is an end view thereof, as seen from the right of FIG. 1.

Referring to FIGS. 1, 2, and 3, illustrating a preferred embodiment, there is shown at 10 the lower part of a carrying case for the apparatus. Within the carrying case, there is a housing 12, provided with a top deck 14 and an inclined viewing and control panel 16. A pair of spaced spindles 18 and 20 pass upward through the deck 14, and are adapted to removably receive a supply reel 22 and a take-up reel 24, respectively. The reels 22 and 24 are adapted to receive a film 26 used in the apparatus.

The film 26 is adapted to pass under or through the following elements, disposed forwardly and between the reels in series: a tension idler 28, playback head 30 (FIG. 3) including a photoelectric cell 32 and an exciter lamp assembly 34 (or alternatively, a magnetic playback head), a sprocket wheel 36, a picture projection system 38 including a lamp and condenser assembly 40 and an optical scanner 42, and a tension idler 44. The various elements, except the reels, are protected by a cover 46 hinged at 48. A cover latch 50 retains the cover 46 in closed position.

The panel 16 includes the following elements: main power switch 52, microphone jack 56, translux screen 58, recording level meter 60, six function selector keys 62, stop key 64, tone control 66 and gain control 68.

The film 26 is of the conventional type, having a series of sprocket openings on either side of a series of picture frames, and an optical (or magnetic) sound track.

Referring to FIG. 3, schematically showing the hookup, there is also provided a microphone 70 and a set of headphones 72, both connected with an audio selector 74. The audio selector 74 is connected with a series of audio circuits schematically shown at 76, which, in turn, are connected with the recording level meter 60, the tone control 66, and the gain control 68.

There is also included a plug 78 adapted to be connected with a source of alternating current, in series with the main power switch 52 and a fuse 82 leading to a direct current power supply 80. A power selector is schematically shown at 84, which is mechanically connected with the function selector keys 62, and with the audio selector 74, as shown in broken lines. A magnetic clutch drive 86 connects a motor M-1 with the sprocket wheel 36, to furnish the driving force for the optical scanner 42, as will appear more fully hereinafter.

The invention also includes an oscillator 90 electrically connected with the power supply 80 by way of a conductor, 91 from which a branch 93 leads to an amplifier 88, as shown in FIG. 4.

The invention also includes an endless recorder mechanism, designated by the reference numeral 92, driven from the motor M-1 by a system of reduction gearing 94. The repeater unit 92 comprises a driven spool 96, driven from the motor M-1, and a spaced idler spool 98, there being an endless recording tape 100 reeved over the spools 96 and 98. The recording tape 100 is adapted to carry a pair of parallel magnetic sound tracks, not shown, and cooperating therewith are an instructor recording and playback head 102, and instructor erase head 104, a student recording and playback head 106, and a student erase head 108.

The magnetic clutch drive 86 includes a driven element 110, which is mechanically connected with the sprocket 36, and with the optical scanner 42, by a system of gearing 112.

The projection mechanism includes a lens 114 and prisms 116, which transmit the picture from the film onto the translux screen 58 in the manner well known in the art.

Referring to FIG. 3, the spindle 18 is driven by a rewind motor M-2, and the spindle 20 of the take-up reel 24 is driven by a motor M-3.

The motor M-1 is a synchronous motor, and is in operation and is mechanically coupled with the repeater unit 92 at all times when the device is in operation. The motor M-1 is adapted to drive the optical scanner 42 and the sprocket drive 36 at a constant speed of preferably 32 frames per second. The optical scanner 42 is of a type well known in the art, comprising a rotating optical device synchronized with the speed of the film and adapted to project a picture through the lens 114 and prisms 116 onto the translux screen 58 in a conventional manner. The film, in traversing from the supply reel 22 to the takeup reel 24 in normal operation, passes between the photoelectric cell 32 and the exciter lamp assembly 34 (or alternatively past the magnetic head), whereby the sound track on the film is reproduced in a conventional manner. The motor M–3 is designed for slow, normal forward and for rapid forward traverse of the film while the motor M–2 is designed for rapid reverse traverse of the film, as indicated by the arrows thereon.

FIG. 4 illustrates the electric control circuit in which the pushbutton keys 1, 2, 3, 4, 5, 6 and 7 are shown mechanically connected with control switches. With the plug 78 connected with a source of electric energy, there is a flow of current by way of conductor 118, fuse 82 and conductor 120 to the power supply 80, and by conductors 126, 124 and closed power switch 52 and conductor 122 to the plug 78. Branch conduits 128, 130 and 132, from the conductors 124 and 118, conduct electric current to the motor M–1, and to the projection lamp and condenser assembly 40 in parallel, these two units being continuously energized while the apparatus is in operation. In this manner, the lamp and condenser assembly 40 is in operation to project a picture from the film onto the translux screen 58, and the electronic voice repeater unit 92 is continuously operating, causing the endless tape 100, with the two magnetic sound tracks thereon, to pass before the various recording, playback and erasing heads.

Operation of the normal forward control button 1, (FIG. 4), causes the film to be projected at normal operating speed of 32 frames per second, while the instructor's voice on the film is being reproduced and is being recorded on one of the tracks on the endless tape 100. Operation of the button 1 causes a flow of current from the power supply 80, conductor 148, switch 1–A, and conductor 150 to energize relay $$\frac{RY1}{3}$$

which closes the normally open switches, RY1–1 and RY1–2, and opens the normally closed switch RY1–3. Current also flows by conductor 148, closed switch 1–B, conductor 152 to the magnetic clutch 86, causing rotation of the clutch-driven element 110 and the sprocket wheel 36 and the optical scanner 42 connected therewith. Closing of the switch 1–C connects the output of amplifier 88 by conductors 154 and 156 to the sound reproducer 72, and at the same time the closing of the switch 1–D connects the output of the amplifier 88 by way of conductors 158 and 160 to the instructor's recording and playback head 102. Closing of the switch 1–E connects the film track or instructor playback head 30 with the input side of the amplifier 88 by way of conductors 164 and 162, while closing of the switch 1–F connects the output of the oscillator 90 with the instructor erase head 104 by way of conductors 166 and 170. There is also a flow of current from conductors 124; 134, closed switch 7–B, conductors 136 and 138, and through the resistors 140 and 142 and the parallel conduits 144 and 146, through the motors M–2 and M–3, and by conductors 132 and 118, which maintains these motors in operation with a reduced current, whereby the operation of the sprocket drive 36 permits the winding of the film 26 on the take-up reel 24 and the winding from the supply reel 22, in a well-known manner.

During such operation, the film is transversed at its normal speed of 32 frames per second and a picture is projected on the translux screen 58, which may be viewed by the student, who at the same time, can hear the voice played from the recorded track on the film, through the head phones 72. At the same time, a recording is being made on one of the tracks of the endless tape 100 by the instructor recording and playback head 102.

On depressing the instructor playback button No. 2, the film stops moving and a still frame is projected on the screen 58, while the previously recorded instructor's voice is reproduced from the track on the endless tape 100. The closing of the switch 2–B permits a flow of current from the power supply 80, conductor 148, switch 1–B and conductor 172, to a frame centering solenoid 173. Current also flows from the output side of the amplifier 88, by way of conductor 154, closed switch 2–C, and conductor 146 to the head phones 72, while the output from the instructor recording and playback head 102 travels by conductor 160, closed switch 2–E, and conductor 162 to the input side of the amplifier 88. The student then hears a playback of the rerecording of the instructor's sound from one of the sound tracks on the endless tape 100, while watching a still picture on the screen 58.

When the student wishes to record his repetition of the instructor's playback, he depresses button No. 3. There is a current flow through the conductor 148, switch 3–B and conductor 172 to the frame centering solenoid 173. Current fom the output side of the amplifier 88 passes through conductor 158, switch 3–D and conductor 178 to the student recording and playback head 106, while the student's microphone 70 is connected with the input side of the amplifier 88 by way of the conductor 174, switch 3–E and conductor 175. At the same time, current flows from the oscillator 90, conductor 166, switch 3–F and conductor 176 to the student erase head 108. In such operation, the energization of the frame centering solenoid 173 retains the image on the translux screen 58 in proper position, while the student's repetition in the microphone 70 is being recorded on the student's track on the endless tape 100 by energization of the student recording and playback head 106, and at the same time the oscillator 90 effects the erasure of any previous recording on that track through energization of the erase head 108.

By depressing the student playback button No. 4, the student may hear the playback of his previous recording. Current from the power supply 80 travels by conductor 148, switch 4–B, and conductor 172 to the frame centering solenoid 173. The output from the amplifier 88 is fed by conductor 154, switch 4–C and conductor 156 to the sound reproducer 72, and the output from the student recording playback head 106 is fed through conductor 178, switch 4–E and conductor 162 to the input side of the amplifier 88. In this step of operation, the student is permitted to hear and analyze the playback of his repetition of the instructor's sounds, while the image is retained in a centered position on the translux screen 58. The depression of the button No. 5 effects a rapid forward traverse of the film 26, as follows: current, from the power supply 80, passes by conductor 148, switch 5–A and conductor 150 to relay $$\frac{RY1}{3}$$

Current also flows from conductor 122, power switch 52, conductors 124 and 134, switch 7–B, conductor 136, switch 5–B, and conductor 144, motor M–3 and conductors 132 and 118, feeding full line voltage through the forward motor M–3 to operate the take-up reel 24 at high speed. To effect rapid reverse traverse, pushbutton No. 6 is depressed, which closes switch 6–B to supply full line voltage by way of conductor 122, power switch 52, conductors 124 and 134, switch 7–B, conductor 136, switch 6–B and conductor 146, motor M–2 and conductors 132 and 118, to cause rapid operation of the motor M–2 to rewind the film on the supply reel 22.

With reference to the last two steps of operation, it should be noted that the motor M–2 in the case of rapid forward traverse, and the motor M–3 in the case of rapid reverse traverse, are connected with the source of electric current through the resistors 140 and 142, respectively, to provide a normal operating tension on the film to prevent overrunning. The operation of the stop button No. 7 brings the film 26 to a stop by applying direct current to the appropriate motor, causing dynamic braking to take place. The opening of the switch 7–B disconnects current flow between the conductors 134 and 136, and stops the feed of energizing current to the forward and reverse motors M–3 and M–2. Closing of the switch 7–C permits a flow of current through the conductor 148, switch 7–C and conductor 179 to the relay $$\frac{RY1}{3}$$

to keep the same energized if it were in the energized state immediately prior to the depression of the stop button No. 7. The closing of the switch 7–D feeds current through conductors 122, 124 and 181, switch 7–D and conductor 180, to the motors M–2 or M–3 through the switches RY1–2, RY1–3. If the relay $$\frac{RY1}{3}$$

is in its energized state, which would be the situation if the film has been moving in the forward direction, the current will be applied to the reverse motor M–2 by way of the conductor 182, switch RY1–2, motor M–2 and conductors 132 and 118. Conversely, if the relay $$\frac{RY1}{3}$$

is in its unoperated condition, the current will be fed through the conductor 184, switch RY1–3, conductor 144, forward motor M–3 and conductors 132 and 118. It will be observed that under these operating conditions, braking forces will be applied to the motors to rapidly bring the film traverse to a halt.

From the foregoing, it is evident that the apparatus can be used by a student for educational purposes by pursuing the following steps:

(1) Operating pushbutton 1 to project, on the translux screen 58, the picture on the sound motion picture film 26, showing the manner of formation of a particular sound, orally or mechanically produced, and, synchronized therewith, playing back the recorded sound on the film track.

(2) Making a record of this sound on the endless tape 100;

(3) Depressing button 2, to playback the sound rerecorded on the endless tape 100;

(4) Depressing button 3 and repeating the previously rerecorded sound while making a recording thereof on the second sound track on the endless tape 100; and (5) Depressing the student playback button 4 to play back the student's recorded sound to compare it with the instructor's rerecorded sound, which is obviously possible by also depressing the instructor playback button 2.

(6) The length of the endless tape 100 determines the duration of the word or sentence that can be recorded and played back in one revolution of the endless tape. A given endless tape will accommodate sentences of identical length; interchangeable endless tapes will be used for longer or shorter sentences.

This manner of education has a number of advantages in that it is not necessary to reverse or to continuously play back the instructor's recording on the film, but, by making a rerecording thereof on the endless tape 100, the student may use this endless tape to repeat the sound on a parallel track, and may selectively play back the instructor's rerecording or the student's recording on this endless tape, while at the same time having before him the image on the translux screen.

I claim:

1. A method of audio-visual instruction comprising the steps of (1) projecting on a screen the picture on a sound motion picture film representation of the manner of formation of a sound, and synchronized therewith, playing back the recorded sound on the film, (2) rerecording the playback sound during said playing back, (3) stopping said film, (4) recording a student's repetition of the sound, and (5) simultaneously playing back and comparing the student's recording and the said rerecording of the sound while holding said film stopped.

2. A method of audio-visual instruction as defined in claim 1, including the step of simultaneously reprojecting a frame of said stopped film during said playing back and comparing step.

3. An apparatus for audio-visual instruction comprising: means to traverse an instructor film having a picture and a sound track; means to scan the picture on a screen; means to playback the sound track on the instructor film; means to traverse an endless recorder having a pair of independent sound tracks; a plurality of means, associated with each of said pair of independent sound tracks, to, respectively, record, play back and erase signals thereon; plural control means for selectively operating said film traverse means, scanning means, playback means, recording means, and erasing means; and means for connecting the output of said playback means for said sound track on said instructor film to said recording means of said endless recorder.

4. An apparatus as defined in claim 3, in which said means to traverse an endless recorder comprises a continuously operating motor.

5. An apparatus as defined in claim 3, in which the means to traverse the film comprises a forward motor and a reverse motor, in which the means to traverse an endless recorder comprises a motor and clutch means selectively operable to interconnect the film traverse means and the endless recorder traverse means to assure synchronous movement.

6. An apparatus for audio-visual instruction, comprising; means to traverse an instructor film having a picture and a sound track, including power means to drive in forward and reverse directions; a screen and means to project the picture on said screen; means to play back the sound track on the instructor film; an endless recorder having a pair of independent sound tracks; means associated with each sound track on said endless recorder, to record, play back and erase signals thereon; power means for traversing said endless recorder, a microphone; first control means operable to traverse the instructor film at normal speed; project the picture onto the screen, play back the recorded sound on the film, and to record the sound on one of the sound tracks on said endless recorder; second control means operable to play back said recorded sound on said one of said sound tracks; third control means operable to record sounds received by said microphone on the other of the sound tracks on the endless recorder; and fourth control means operable to play back the recorded sound on said other sound track.

7. An apparatus as defined in claim 6, in which said power means for traversing said endless recorder comprises a continuously operating synchronous motor.

8. An apparatus as defined in claim 6, in which said power means for traversing said endless recorder comprises a continuously operating synchronous motor; releasable clutching means interconnecting said film traversing means and said endless recorder traversing means; and in which said first control means is effective to engage said clutching means.

9. An apparatus as defined in claim 6, in which said endless recorder comprises a single loop of recording magnetic tape.

10. An apparatus as defined in claim 6, including fifth control means operable to rapidly traverse the film forwardly while de-energizing the playback means for the film sound track; and sixth control means operable to rapidly traverse the film reversely while de-energizing the playback means for the film sound track.

11. An apparatus as defined in claim 6, in which the picture projecting means includes a continuously energized lamp, and in which second, third and fourth control means include frame centering means to center the picture on the screen.

References Cited in the file of this patent

UNITED STATES PATENTS

| | | |
|---|---|---|
| 2,336,777 | Clausen | Dec. 14, 1943 |
| 2,777,901 | Dostert | Jan. 15, 1957 |
| 2,876,561 | Horne | Mar. 10, 1959 |
| 3,024,319 | Roberts et al. | Mar. 6, 1962 |
| 3,026,634 | Irazoqui | Mar. 27, 1962 |
| 3,059,348 | Mezzacappa | Oct. 23, 1962 |

FOREIGN PATENTS

| | | |
|---|---|---|
| 730,664 | Great Britain | May 25, 1955 |
| 771,104 | Great Britain | Mar. 27, 1957 |